United States Patent Office 3,522,219
Patented July 28, 1970

3,522,219
PROCESS FOR THE SUSPENSION POLYMERIZA-
TION OF β-SUBSTITUTED-β-LACTONES
Aldemaro Ciaperoni, Bollate, Milan, and Giovanni B.
Gechele, Milan, Italy, assignors to Montecatini Edison
S.p.A., Milan, Italy
No Drawing. Filed Jan. 18, 1967, Ser. No. 610,019
Claims priority, application Italy, Jan. 21, 1966,
1,434/66
Int. Cl. C08g 17/017
U.S. Cl. 260—78.3          13 Claims

ABSTRACT OF THE DISCLOSURE

A process for the preparation of polyesters by polymerizing a suspension of a β-substituted-β-lactone in an inert liquid in the presence of a catalyst comprising the halides of the following elements: Cu, Zn, Hg, Cd, B, Al, Ge, In, Ti, Sn, Pb, P, V, Sb, Bi, As, Fe, Co and Ni, and complexes of such halides with halogenated organic compounds.

BACKGROUND OF THE INVENTION

The present invention relates to a process for producing polyesters through the polymerization of lactones, and, more particularly, it relates to a process for obtaining polyesters through the catalytic polymerization of β-substituted-β-lactones in solid state.

The polyesters obtained through the polymerization of lactones have relatively high molecular weights and can be molded, extruded or submitted to other manufacture processes. They can be plasticized, colored, admixed with light and heat stabilizers, fillers and other suitable materials. They can be used for manufacturing films, fibres and molded articles.

It is known in the art that lactones polymerize at a low temperature under the influence of radiation or at relatively high temperature bulk-polymerize in the presence of suitable catalytic systems.

The known systems for the polymerization of lactones involve, however, some inconveniences. One of these inconveniences is due to the rather high temperatures which develop during bulk polymerization, and when working according to this technique it is in fact difficult to dissipate the heat developed by the reaction, which consequently, gives rise to polymers having low molecular weights.

Therefore an object of this invention is that of providing a new process for the polymerization of β-substituted-β-lactones.

Another object is that of providing a process for the polymerization of β-substituted-β-lactones free from the inconveniences attendant upon the known processes.

A further object is that of providing a simple economical and efficacious process affording good conversions and good yields.

A still further object is that of providing a process readily affording thermal control of the polymerization reaction.

Yet another object is that of providing a process for the polymerization of β-substituted-β-lactones in which inexpensive substances with particular catalytic activity are used as catalysts.

These and other objects will become more evident by means of the following description which evidence also the remarkable advantages afforded by this invention.

An advantage of this invention is the easy thermal control of the reaction, allowed by the particular way of carrying out the polymerization. Another advantage of the process according to this invention is the possibility of obtaining polymers with high molecular weights with good conversions and yields.

A further advantage, favorably influencing the cost of the process, is the use of inexpensive catalysts having high catalytic activity, and which are readily available on the market.

THE INVENTION

According to this invention, polymers of the recurrent structural unit

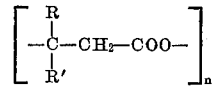

(wherein R and R' can be the same or different and represent lower alkyl or halo lower alkyl of up to 8 carbon atoms or aryl or haloaryl or nitroaryl of up to 10 carbon atoms, with the proviso that one of such moieties can be hydrogen if the remaining is other than hydrogen) are obtained by polymerizing at low temperatures, solid β-substituted-β-lactones in suspension in a paraffinic hydrocarbon.

The polymerization is carried out in the presence of a catalyst wholly or partially dissolved in a suspending medium and comprised of the halides of elements chosen among Cu, Zn, Hg, B, Al, Ge, In, Ti, Sn, Pb, P, V, Sb, Bi, As, Fe, Co, Ni or complexes of these elements with halogenated compounds, where the halogen is weakly linked, used separately or mixed together, at a temperature ranging between −180° C. and +50° C., in an innert gas atmosphere and under anhydrous conditions.

According to an embodiment of this invention, β-substituted-β-lactones of the structural formula:

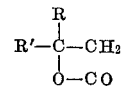

(wherein R and R' can be the same or different and represent lower alkyl or halo lower alkyl of up to 8 carbon atoms, or aryl or halogen-aryl or nitroaryl of up to 10 carbon atoms, with the proviso that one of such moieties can be hydrogen if the remaining is other than hydrogen) are suspended in solid state, finely particuled, under stirring action, in a paraffinic or cycloparaffinic hydrocarbon, as, for example, n-pentane, n-hexane, cyclobutane, cyclopentane and containing dissolved therein a catalyst comprising for example, CuBr, ZnCl$_2$, BF$_3$, AlCl$_3$, TiCl$_4$, SnCl$_4$, PF$_5$, SbCl$_5$, FeCl$_3$, FeF$_3$ or

[CH$_3$CO]$^+$·[SnCl$_5$]$^-$, [CH$_3$OCH$_2$]$^+$·[SbCl$_6$]$^-$

[(CH$_3$)$_3$C]$^+$·[TiCl$_5$]$^-$, [(C$_6$H$_5$)$_3$C]$^+$·[FeCl$_4$]$^-$ and others, used separately or mixed together, with a molar concentration comprised between about 0.1% and 10% of the monomer, at a temperature ranging from between about −180° C. and +50° C., but preferably between −120° C. and +30° C. in a nitrogen atmosphere and under highly anhydrous conditions. Polymers with relatively high molecular weights and good conversions and yields are obtained in this manner.

The monomers employed in this invention can be: β-chloromethyl-β-methyl-β-propiolactone; β-n-propyl - β-propiolactone or isopropyl-β-propiolactone; β-methyl-β-n-butyl-β-propiolactone or β-methyl-β-isobutyl-β-propiolactone; β-methyl-β-propiolactone; β-methyl-β-ethyl - β-propiolactone; β-ethyl-β-propiolactone, β-trichloromethyl-β-propiolactone; β-isobutyl-β-propiolactone. The use of β-β'-dimethyl-β-propiolactone proved to be particularly advantageous.

The aliphatic or cycloaliphatic hydrocarbons used as the reaction medium are included in the group of ethane, propane, pentane, hexane, heptane, octane, cyclopropane, cyclobutane, cyclopentane, cyclohexane. The use of pentane, n-hexane or cyclohexane affords particular advantages.

The catalysts employed are halides of elements such as Zn, Cd, Hg, B, Al, Ge, In, Ti, Sn, Pb, P, V, Sb, Bi, As, Fe, Co, Ni or complexes of these elements with halogenated organic aliphatic compounds.

The use of catalysts selected from CuBr, $ZnCl_2$, $BF_3$, $AlCl_3$, $TiCl_4$, $SnCl_4$, $PF_5$, $SbCl_5$, $FeCl_3$, $FeF_3$ or

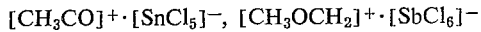

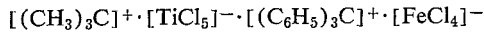

separately or mixed together, proved particularly advantageous.

The molar concentration of the catalysts in the liquid ranges from between about 0.1% and 10% but preferably from between about 1% and 7% of the monomer suspended.

The temperature is not critical and must be consistent with the fact that the monomer in the suspension is in the solid state. The temperature ranges from about —180° C. up to +50° C., but preferably from about —120° C. up to +30° C.

The reaction must be conducted under strictly anhydrous conditions and in an inert gas atmosphere, a tolerance of $O_2$ lower than 20 p.p.m. being tolerated.

In order to further illustrate the present invention and the advantage thereof, the following specific examples are given, it being underrstood that the same merely intended to be illustrative and not limitative.

Example 1

45 cc. hexane distilled on $P_2O_5$, 0.05 mole (corresponding to 5 ml.) β-dimethyl-β-propiolactone (melting point: 26.5° C.), 0.13 cc. $TiCl_4$ (Density=1.76 gr./cc.) were in said sequence introduced by means of graduated syringes into a multiple neck flask through which was passed a pure $N_2$ flow and placed in a bath thermostatically controlled at +35° C.±0.2° C. This system is equipped with a stirrer which was operating also during the input of the above specified substances. The molar ratio catalyst: β-β-dimethyl-β-propiolactone is $2.5.10^{-2}$.

The initial reaction conditions were maintained for 5 hours; then the stirring was stopped, the hexane decanted and the polymer dissolved in $CHCl_3$. After being dissolved, the polymer was precipitated—under stirring—in 700 cc. of methyl-alcohol and 120 cc. water. This mixture of methanol and water in the above ratio avoids the problem of oligomers and unreacted monomer precipitating together with the polymer.

After filtering and drying, a white, crystalline polymer is obtained with a yield amounting to 42% of the monomer used. This polymer had a molecular weight of 5000.

Stability against acid and alkali hydrolysis was among others, a remarkable characteristic of the polymer thus obtained.

Example 2

By means of same equipment and operations as described in Example 1, but inverting the addition sequence of the catalyst in respect to the monomer, the same results as above are achieved through the use of the same reagents in the same quantities as above specified.

Example 3

45 cc. hexane, 0.05 mole β-β-dimethyl-β-propiolactone, 28 cc. $BF_3$ (density≅3 gr./l.) are in said sequence fed under stirring into the equipment specified in Example 1 through which was passed a pure $N_2$ flow, at a temperature of —35° C. The molar ratio between catalyst and β-β-dimethylpropiolactone being=$2.5.10^{-2}$. The stirrer ran for 7 hours at —35° C. When the reaction was over the hexane was decanted, the polymer dissolved in $CHCl_3$, and then precipitated—under stirring—in 700 cc. methyl alcohol mixed with 120 cc. $H_2O$.

After filtering and drying a white, crystalline polymer was obtained in a yield of 40%. This polymer had a molecular weight of 6000.

Example 4

By operating according to Example 3 but with a molar ratio catalyst: β-β-dimethyl-propiolactone=$1.25.10^{-2}$, a white, crystalline polymer with a molecular weight=7000 was obtained in a yield of 30%.

Example 5

45 cc. hexane, 0.05 mole β-β-dimethyl-propiolactone, 0.275 cc. $SnCl_4$ (density=2.26 gr./cc.). (The molar ratio between catalyst and β-β-dimethyl-propiolactone being $5.10^{-2}$) were in said sequence fed under stirring into the equipment specified in Example 1 through which was passed a pure $N_2$ flow, under a temperature of —35° C.

The reaction conditions were maintained for 6 hours. When the reaction was over, the polymer was separated in the same way as specified in Example 1. A white, crystalline polymer with a molecular weight of 6500 was obtained in a yield of 36%.

Example 6

By operating according to Example 5 but with a molar ratio catalyst: β - β - dimethyl-propiolactone=$2.5.10^{-2}$, polymer with a molecular weight of 5000 is obtained in a yield of 30%.

Example 7

45 cc. heptane, 0.05 mole β-β-dimethyl-propiolactone, 0.16 cc. $SbCl_5$ (density=2.35 gr./cc.). (The molar ratio catalyst: β-β-dimethyl-propiolactone being consequently=$2.5.10^{-2}$) were in said sequence fed under stirring into the equipment specified in Example 1, through which was passed a pure $N_2$ flow, under a temperature of —35 °C.

The reaction conditions were maintained for 5 hours. The yield of white, crystalline polymer with a molecular weight of 5500 was 36%.

Example 8

By operating according to Example 7 but under a temperature of —78° C. the yield of white, crystalline polymer of a molecular weight of 6500 was 40% of the monomer used.

Example 9

By operating according to Example 7 but with a molar ratio catalyst: β - β - dimethyl-propiolactone=$1.5.10^{-2}$, polymer with a molecular weight of 6300 was obtained in a yield amounting to 35% of the monomer used.

Example 10

0.116 gr. $FeCl_3$, 50 cc. hexane, 2.8 cc. β-β-dimethyl-propiolactone, being the molar ratio catalyst: monomer=$2.5.10^{-2}$, were in said sequence fed under stirring into the equipment specified in Example 1, through which was passed a pure $N_2$ flow, at a temperature of —35° C.

The reaction conditions were maintained for 5 hours. When the reaction was over, the polymer was separated as specified in Example 1 and had a molecular weight of 6000 and obtained in a yield of 39% of the monomer used.

Example 11

45 cc. hexane, 0.05 mole β-β-dimethyl-propiolactone, 0.255 cc. equimolecular solution of $CH_3COCl$ and $SnCl_4$, corresponding to the complex $[CH_3CO]^+ \cdot [SnCl_5]^-$ were in said sequence fed under stirring into the equipment specified in Example 1 through which was passed a pure $N_2$ flow, under a temperature of —35° C.

The ratio catalyst: β-β-dimethyl-propiolactone was =$2.5.10^{-2}$.

The reaction conditions were maintained for 6 hours. When the reaction was over, the polymer was separated via the same process as specified in Example 1 and displayed a white crystalline appearance, a molecular weight of 5500 and in a yield amounting to 30% of the monomer used.

Example 12

45 cc. hexane, 0.05 mole β-β-dimethyl-propiolactone, 4 cc. solution of $BF_3(C_2H_5O)_2$ at 47% in ethyl are in said sequence fed under stirring into the equipment specified in Example 1 through which was passed a pure $N_2$ flow, under a temperature of $-35°$ C. The molar ratio catalyst: monomer was $=2.5.10^{-2}$.

The reaction conditions were maintained for 5 hours. When the reaction was over, the polymer was separated via the same process as specified in Example 1, and displayed a molecular weight of 5000, and in a yield of 10% of the monomer used.

Example 13

0.05 mole β-β-dimethyl-propiolactone and 0.14 cc. $SnCl_4$ were in said sequence fed into the equipment specified in Example 1 through which was passed a pure $N_2$ flow, at a temperature of 25° C.

The reaction conditions were maintained for 5 hours. A violent initial reaction took place and the monomer was partially decomposed. Traces of polymer were produced.

This example is carried out without any solvent with a view towards proving that a solvent is necessary for allowing the polymerization to take place.

Example 14

45 cc. hexane, 0.05 mole β-chloromethyl-β-methyl-β-propiolactone and 28 cc. $BF_3$, being the molar ratio catalyst: monomer $=2.5.10^{-2}$, were in said sequence fed under stirring into the equipment specified in Example 1 through which was passed a pure $N_2$ flow, under temperature of $-35°$ C.

After 5 hours the polymer was separated and exhibited a molecular weight of 1300. Its yield was 10% of the monomer used.

Example 15

45 cc. cyclopentane, 0.05 mole β-methyl-β-n-butyl-β-propiolactone and 0.13 cc. $TiCl_4$, the latter being added under stirring, were in said sequence fed into the equipment specified in Example 1 through which was passed a pure $N_2$ flow, under a temperature of $-35°$ C. The molar ratio catalyst: monomer is $=2.5.10^{-2}$.

The stirring action was stopped after 5 hours and the polymer separated. The yield of polymer was 21% of the used monomer and its molecular weight was 2100.

Example 16

45 cc. hexane followed by 0.05 mole β-β-dimethyl-propiolactone and 0.335 gr. CuBr, the latter being added under stirring, was in said sequence fed into the equipment specified in Example 1, through which was passed a pure $N_2$ flow, under a temperature of $-35°$ C. The molar ratio catalyst: monomer was $=5.10^{-2}$.

The stirring action was stopped after 5 hours and the polymer separated according to the process specified in Example 1. The yield of polymer was 8% of the monomer used. The polymer molecular weight was 1700.

Example 17

45 cc. pentane followed by 0.05 mole β-β-diamethyl-propiolactone and 78 cc. $BF_3$, the latter being added under stirring, were in said sequence fed into the equipment specified in Example 1, through which was passed a pure nitrogen flow, at a temperature of $-110°$ C. The molar ratio catalyst: monomer was $=7.10^{-2}$. The stirring action was stopped after 5 hours and the polymers separated according to the process specified in Example 1.

The polymer molecular weight was 7200 and its yield was 42% of the monomer used.

Example 18

45 cc. cyclohexane, 0.05 mole β-isobutyl-β-propriolactone, 28 cc. $BF_3$ were in said sequence fed under stirring into the equipment specified in Example 1, through which was passed a pure nitrogen flow, at a temperature of $-50°$ C. The molar ratio catalyst: monomer was $=2.5.10^{-2}$.

The stirring action was stopped after 5 hours and the polymer separated according to the operations specified in Example 1.

The separated polymer had a molecular weight of 3000 and its yield was 15% of the monomer used.

Example 19

45 cc. cyclopentane, 0.05 mole β-methyl-β-n-butyl-β-propiolactone, 0.13 cc. $TiCl_4$ dissolved in ethyl ether were in said sequence fed under stirring into the equipment specified in Example 1, through which was passed a pure nitrogen flow at a temperature of $-40°$ C. The molar ratio catalyst: monomer was $=2.5.10^{-2}$. The stirring action was stopped after 5 hours and the polymer, separated with the same process as specified in Example 1, had a molecular weight of 2000 and the yield was 6% of the monomer used.

Example 20

45 cc. cyclopentane, 0.05 mole β-methyl-β-propiolactone and 30 cc. $PF_5$ were in said sequence fed under stirring into the equipment specified in Example 1, through which was passed a pure nitrogen flow, at a temperature of $-50°$ C. The molar ratio catalyst: monomer was $=3.10^{-2}$. The stirring action was stopped after 5 hours and the polymer separated with the same process as specified in Example 1. Said polymer had a molecular weight of 5000 and in a yield which was 20% of the monomer used.

Example 21

45 cc. hexane, 0.05 mole β-phenyl-β-propiolactone, 0.222 g. $SnCl_4$ are in said sequence fed, under stirring into the equipment specified in Example 1, through which was passed a pure $N_2$ flow, at a temperature of $-35°$ C. The molar ratio between catalyst and β-phenyl-β-propiolactone was $3.10^{-2}$. The stirrer ran for 5 hours at $-35°$ C. and the polymer was separated according to the way specified in Example 1.

The polymer was obtained in a yield of 31% and had a molecular weight of 3700.

Example 22

45 cc. hexane, 0.05 mole β-phenyl-β-methyl propiolactone, 0.242 g. $SnCl_4$ are in said sequence fed under stirring into the equipment specified in Example 1, through which was passed a pure $N_2$ flow, at a temperature of $-35°$ C.

The molar ratio between catalyst and monomer was $3.10^{-2}$. The stirrer ran for 5 hours at $-35°$ C. and the polymer was separated according to the technique specified in Example 1. The polymer was obtained in a yield of 35% and had a molecular weight of 3500.

As many apparently widely different embodiments of the present invention can be made without departing from the spirit and scope thereof, it is to be understood that the same is not intended to be limited to the preferred embodiments thereof, except as defined in the appended claims.

What is claimed is:

1. A process for the preparation of polyesters comprising catalytically polymerizing a solid monomeric β-substituted-β-lactone having the structural formula:

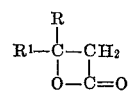

wherein R and $R^1$ can be the same or different and represent hydrogen, lower alkyl of up to 8 carbon atoms, halo-lower alkyl of up to 8 carbon atoms, aryl, halo-aryl and nitroaryl of up to 10 carbon atoms, with the proviso that only one of said R and $R^1$ moities can be hydrogen, in the presence of a catalyst selected from the group consisting of the halides of elements selected from the group consisting of Cu, Zn, Hg, Cd, B, Al, Ge, In, Ti, Sn, Pb, P, V, Sb, Bi, As, Fe, Co and Ni, and complexes of such halides with halogenated organic aliphatic compounds and mixtures thereof, the polymerization being carried out while the solid monomeric lactone is suspended in an inert suspension medium selected from the group consisting of a paraffinic hydrocarbon and a cycloparaffinic hydrocarbon.

2. The process as defined by claim 1, wherein the polymerization is conducted at temperatures below 50° C. in an inert gas atmosphere and under anhydrous conditions.

3. The process as defined by claim 2, wherein the catalyst is selected from the group consisting of CuBr, $ZnCl_2$, $BF_3$, $AlCl_3$, $TiCl_4$, $SnCl_4$, $PF_5$, $SbCl_5$, $FeCl_3$ and $FeF_3$, and mixtures thereof.

4. The process as defined b claim 2, wherein the catalyst is selected from the group consisting of

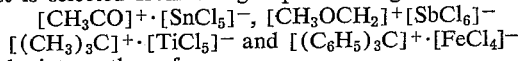

and mixtures thereof.

5. The process as defined by claim 2, wherein the inert suspending liquid is selected from the group consisting of ethane, propane, pentane, hexane, heptane, octane, cyclopropane, cyclobutane, cyclopentane, n-hexane, n-pentane, n-heptane and cyclohexane, and mixtures thereof.

6. The process as defined by claim 5, wherein the β-substituted-β-lactone is β,β-dimethyl-β-propiolactone.

7. The process as defined by claim 5, wherein the polymerization takes place at temperatures lower than the melting point of the suspended lactone and in the range of from between about −180° C. and +50° C.

8. The process as defined by claim 7, wherein the temperature ranges from between above −120° C. and +30° C.

9. The process as defined by claim 7, wherein the molar concentration of catalyst ranges from between about 0.1% and 10% of the monomer suspended.

10. The process as defined by claim 9, wherein the molar concentration ranges from between about 1% and 7%.

11. The process as defined by claim 1, wherein the catalyst is either wholly or partially dissolved in the inert suspending liquid.

12. The process as defined by claim 5, wherein the inert suspending liquid is selected from the group consisting of pentane, n-hexane and cyclohexane.

13. The process as defined by claim 5, wherein the β-substituted-β-lactone is selected from the group consisting of β-chloromethyl-β-methyl-β-propiolactone, β-n-propyl-β-propiolactone, β-isopropyl-β-propiolactone, β-methyl-β-n-butyl-β-propiolactone, β-methyl-β-isobutyl-β-propiolactone, β-methyl - β - propiolactone, β-methyl-β-ethyl-β-propiolactone, β-ethyl-β-propiolactone, β-trichloromethyl-β-propiolactone, and β-isobutyl-β-propiolactone.

References Cited

UNITED STATES PATENTS

| | | |
|---|---|---|
| 3,190,858 | 6/1965 | Cox et al. |
| 3,268,487 | 8/1966 | Klootwijk. |
| 3,380,939 | 4/1968 | Palm et al. |
| 3,418,289 | 12/1968 | Hogsed. |
| 3,232,911 | 2/1966 | Fukui et al. _____ 260—78.3 |

FOREIGN PATENTS 766,347    1/1957    Great Britain.

OTHER REFERENCES

Sheldon et al.: J.A.C.S. 81, 2290 (1959).

Yamashita et al: Kogyo Kagaku Zasshi 66, 104–9 (1963).

WILLIAM H. SHORT, Primary Examiner

E. A. NIELSEN, Assistant Examiner